Oct. 11, 1927.
L. R. MORGAN
1,644,939
CAN CLOSURE
Filed March 22, 1927
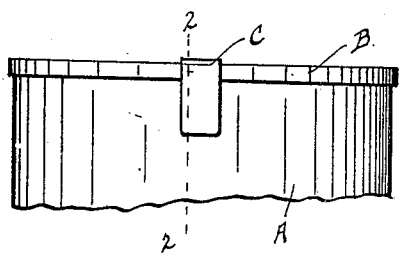
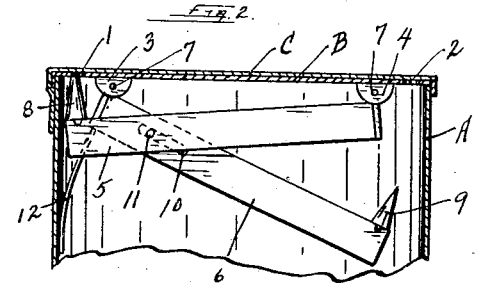
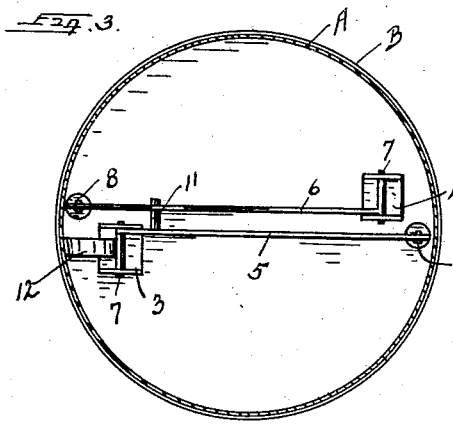
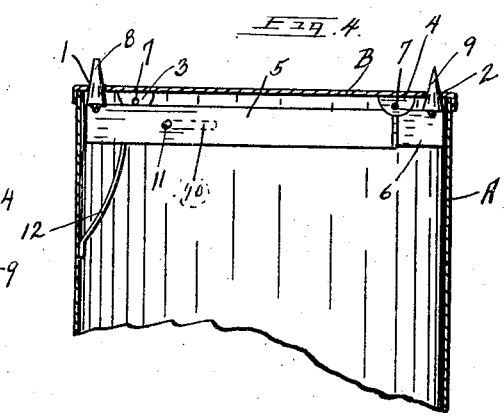
Inventor
Launcelot Reed Morgan
R. M. Thomas
Attorney Patented Oct. 11, 1927.

1,644,939

UNITED STATES PATENT OFFICE.

LAUNCELOT REED MORGAN, OF SALT LAKE CITY, UTAH.

CAN CLOSURE.

Application filed March 22, 1927. Serial No. 177,302.

My invention relates to closures for milk cans and has for its object to provide a new and efficient closure for the top of milk cans which will be economical to build and which will be internally placed within the can when it is manufactured and will be hermetically sealed therein when the can is filled.

A further object is to provide a milk can closure which will eliminate the use of a can opener file or other utensil to open the can and which will seal the milk can with a flat metal strip so that the milk will not spoil when being stored, shipped or in the stores waiting to be sold or used, and will allow for stacking the cans when shipping them.

A still further object is to provide a sanitary milk can closure which will keep the milk clean and sweet longer than has heretofore been possible after the can has been opened, and which will keep dust, dirt and insects from entering the can after it has been opened.

A still further object is to provide a milk can closure which will insure a ready flow of milk from the can when desired without the delay of cleaning out the hole as is the usual custom, and which will keep the milk sweet longer than before by keeping the holes in the top of the can clean and open without any accumulation of sour dried milk caking around the holes.

These objects I accomplish with the device illustrated in the accompanying drawings in which similar numerals and letters of reference indicate like parts throughout the several views and as described in the specification forming a part of this application and pointed out in the appended claims.

In the drawings in which I have shown the best and most preferred manner of building my invention, Figure 1 is a side view of the sealed can ready for shipment. Figure 2 is a section on line 2—2 of Figure 1. Figure 3 is an inverted plan view of the closure means for closing the holes in the top of the can. Figure 4 is a section of the can with the closure means closing the holes in the top of the can after it has been opened and partially used or ready to be used at any time.

In the drawings I have shown the can as A, the top as B, and the closure strip as C. The said closure strip is placed over the top of the can after two holes 1 and 2 have been perforated through the top, and is held in fixed relation to the said top B by soft solder, so that it can be readily pulled off from the can when it is desired to use the milk in the can, but so that the milk will be kept sweet and fresh until such time as it is to be used. Bearings 3 and 4 are secured to the inner side of the top of the can by solder or other suitable means and co-acting lever arms 5 and 6 are pivoted in said bearings by the pins 7. The opposite ends of said lever arms 5 and 6 are provided with tapered closure plugs 8 and 9. The said plugs are secured on the top sides of the said lever arms and are in alinement with the holes 1 and 2, respectively, and are adapted to close said holes when the metal strip C has been removed from the top of the can. A slot 10 is cut longitudinally in the arm 6 and a pin 11 is secured in the said lever arm 5 adapted to move longitudinally in the said slot 10 to move the said arm 6 when the arm 5 is being moved. A spring 12 is secured to the pivoted end of the arm 5 to hold it normally in position so that the plug 9 is closing the hole 2.

The operation of my device is as follows:

The metal strip C is first removed from the top of the can to open the holes 1 and 2. When the said strip C is removed the spring 12 will force the lever arm 5 upwardly and the pin 11 will force the arm 6 upwardly, closing the holes 1 and 2 with the plugs 8 and 9 respectively. The can is then open ready to be used, but the plugs 8 and 9 are closing the holes so that no milk can be poured therefrom and no dirt or insects may enter the can. To open the holes 1 and 2 the finger of the operator is pressed down upon the upper end of the plug 8. The pressure forces the plug 8 downwardly and the lever arm 5 is moved downwardly. This action actuates the pin 11 in the slot 10 and forces the arm 6 downwardly, at the same time opening the hole 2 by removing the plug 9 and at the same time the hole 1 has sufficient space around the plug 8 to allow air to enter therearound and milk can then be poured from the hole 2. Removing the finger from the plug 8, the spring 12 will force the lever arm 5 upwardly again and the pin 11 will force the lever arm 6 up, bringing the plugs 8 and 9 again into the holes 1 and 2, sealing them until further use.

It will be obvious that the same appliance can be used on such as syrup cans, sugar cans and many other similar objects and that slight modifications can be made in the construction of the device without departing from the scope of the claims.

Having thus described my invention, I desire to secure by Letters Patent and claim:

1. In a milk can closure the combination of a metal strip sealed to the top of the can; means to remove said strip; coacting pivoted levers secured on the under side of said top having closure plugs secured on the free ends thereof; and holes in the top of said can adapted to be closed by said plugs when said metal strip has been removed.

2. In a can closure the combination of a metal strip sealed to the top of the can; means to remove said strip; coacting levers secured on the under side of said top having closure plugs secured on the free ends thereof; and holes in the top of said can adapted to be closed by said plugs when said metal strip has been removed.

3. In a milk can closure the combination of coacting pivoted levers secured on the under side of the top of the can having closure plugs secured on the free ends thereof; and holes in the top of said can adapted to be closed by said plugs.

4. In a milk can closure the combination of coacting levers pivoted on the under side of the top of said can; plugs on said levers adapted to close holes in the top of said can; a spring secured on the pivoted end of one of said levers adapted to hold said levers near the top of said can and to normally hold said plugs in said holes in the top of the can to seal them when not being used.

5. In a milk can closure the combination of two spaced apart coacting levers; bearings in which said levers are pivoted; a slot in one of said levers and a pin in the other of said levers adapted to make said levers coact when moved; plugs on the top side of the free ends of said levers adapted to close holes in the top of said can when the holes are not in use; and a spring secured on the end of one of said levers adapted to normally hold both of said levers in yielding relation and to hold the plugs on said levers normally within the holes in the can top.

In testimony whereof I have affixed my signature.

LAUNCELOT REED MORGAN.